July 12, 1966   N. J. HAYES   3,260,007
ANIMAL TAGS

Filed Jan. 14, 1965   2 Sheets-Sheet 1

INVENTOR.
NORMAN J. HAYES
BY
Van Valkenburgh & Lowe
ATTORNEYS

July 12, 1966   N. J. HAYES   3,260,007
ANIMAL TAGS
Filed Jan. 14, 1965   2 Sheets-Sheet 2
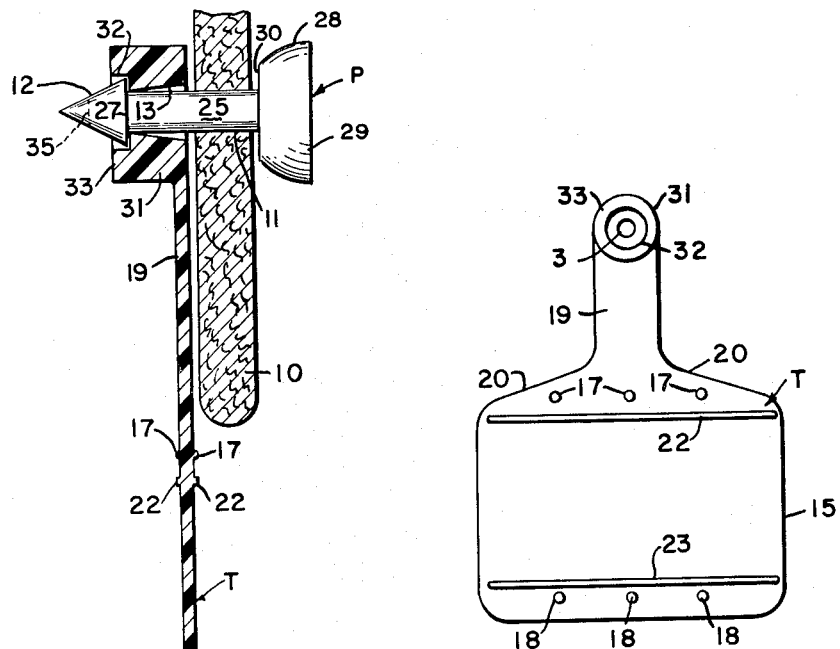
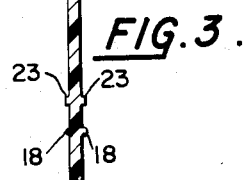
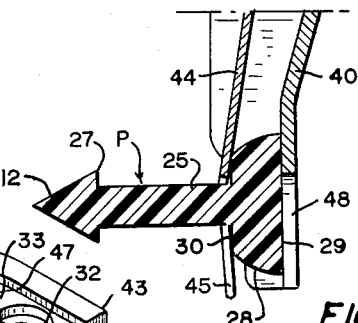
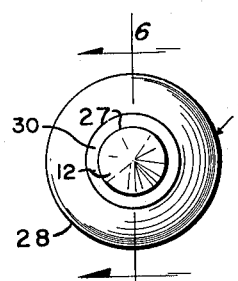
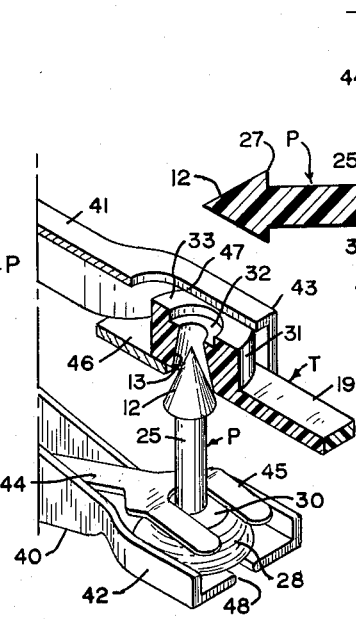
INVENTOR.
NORMAN J. HAYES
BY
ATTORNEYS

United States Patent Office 3,260,007

Patented July 12, 1966

3,260,007
ANIMAL TAGS
Norman J. Hayes, 2138 Shoshone Trail N., Cody, Wyo.
Filed Jan. 14, 1965, Ser. No. 425,498
5 Claims. (Cl. 40—301)

This invention relates to animal tags, utilized to identify animals, particularly cattle, but also utilized in identifying other animals. This application is a continuation-in-part of my copending application Serial No. 277,049, filed April 30, 1963.

Animal tags are utilized to identify specific animals in a herd or group, in order to maintain records for breeding purposes, milk records, feeding plans, wool production and the like. The ear of the animal is a satisfactory part to place an identification tag, although numerous tags are mounted on a chain attached around the neck of the animal. However, neck chains have a tendency to catch on brush and the like, as well as comprising a source of irritation to the animal, who often attempts to remove the chain. Furthermore, an identification tag suspended from a chain around the neck of the animal can be seen from the front only; that is, it cannot be seen from the rear or from a position at either side of the animal. Of course, an ear tag which bears indicia on the front only or the rear only, can be seen only from the front or rear, respectively, and thus should be visible from both the front and rear in order to be an improvement over a neck tag, from the standpoint of visibility. Thus, a satisfactory neck tag should extend below the ear, so that it is visible from both the front and rear, but such a tag should be readily disengageable from any object encountered by the animal and also such a tag should be sufficiently flexible that it will not be damaged by an encounter by the animal with objects such as brush, fences, trees, or the like, and should spring back to its original shape, after such encounter. Furthermore, in order to receive a sufficient number of and sufficiently large identification letters or numbers, the tag should be comparatively wide.

Among the objects of the present invention are to provide a novel animal tag, particularly useful for identification purposes; to provide such a tag which can be attached to the ear of an animal; to provide such a tag having a sufficient width to permit a number of identification marks to be placed thereon; to provide such a tag which may be placed in such a position that it will be visible from both front and rear; to provide such a tag which is relatively flexible and therefore will merely be bent or twisted by an encounter by an animal with an object; to provide such a tag which will spring back to its original shape, after such an encounter; to provide such a tag which is relatively light in weight; to provide such a tag which may be attached to the ear of an animal relatively easily; to provide such a tag which will not tend to catch in brush or on other objects; to provide such a tag which includes a pin which is self piercing; to provide such a pin particularly adapted to cooperate with a tool used in installing the tag; and to provide such a tag which may be manufactured economically but will be efficient and effective in operation.

Additional objects and the novel features of this invention will become apparent from the description which follows, taken in conjunction with the accompanying drawings, in which:

FIG. 3 is a generally vertical section, on an enlarged scale, taken along line 3—3 of FIG. 2;

FIG. 4 is a front elevation, on an enlarged scale, of the tag of FIG. 1;

FIG. 5 is a front elevation, on an enlarged scale, of a pin utilized with the tag of FIG. 4;

FIG. 6 is a longitudinal section, taken along line 6—6 of FIG. 5, with a portion of a tool used in installation of the tag being shown in section; and FIG. 7 is a fragmentary perspective view of the end of the installation tool, with the pin and tag in the position occupied during installation, the ear of the animal being omitted and the tag and a portion of the tool being shown in section, for clarity of illustration.

Figure 1:
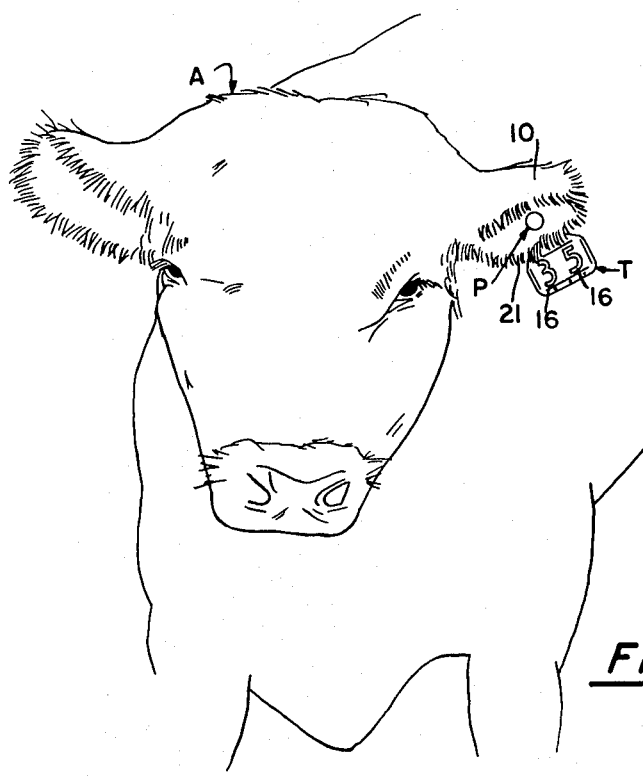
FIG. 1 is a front perspective view, on a reduced scale, of a portion of an animal such as a heifer, on an ear of which is installed a tag constructed in accordance with this invention.
Figure 2:
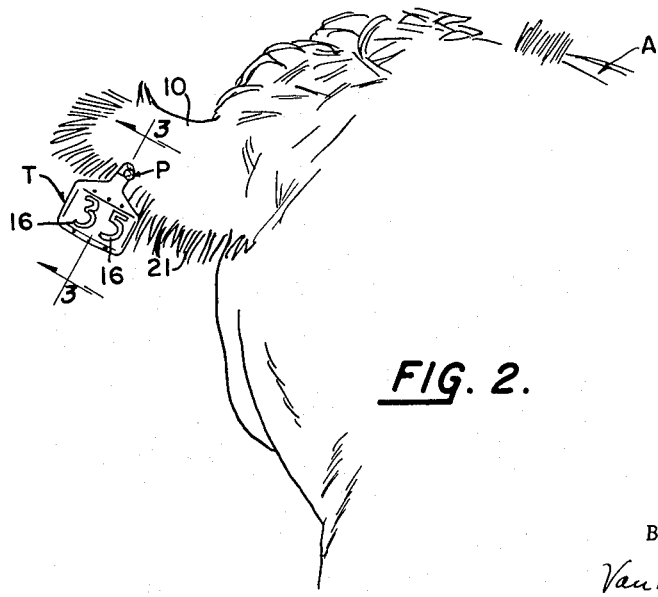
FIG. 2 is a rear perspective view, on a slightly larger scale, of the head of the animal of FIG. 1.

As in FIGS. 1 and 2, a tag T, constructed in accordance with this invention, is attached by means of a pin P to an ear 10 of an animal A, which may be a heifer, as shown, or may be any other type of animal, such as a cow, bull, steer, or other large animal. It will be understood, of course, that the tag of this invention may be made, as in a smaller size, for use on smaller animals, such as sheep, goats, pigs and the like. Also, the tag of this invention may be utilized for wild life identification purposes, such as on elk, deer and other wild animals. For installation of the tag T, a hole 11, as in FIG. 3, is made in the lower, outer portion of the ear 10 of the animal, which is less tender and can be made in the animal's ear, without undue discomfort, by the self piercing action of a conical point 12 of the pin P, through use of a tool described later. As the hole 11 is pierced, the pin P is inserted through a hole 13 in the upper end of the tag T, the tag T being placed on the rear side of the ear, so that when the animal brushes past an object, the tag T will be between the ear and the side of the head or neck of the animal, thus having a considerably less tendency to be snagged.

As in FIGS. 3 and 4, the tag T is provided with a relatively wide base 15 on which indicating marks 16 of FIGS. 1 and 2 may be placed, on both front and rear. As shown, there are two indicating marks 16, one on each half of the base, both front and rear, but when a greater number of marks are placed thereon, they may be placed in the spaces indicated by a series of upper projections 17 and lower projections 18, as in FIGS. 3 and 4, disposed on both sides of the tag and spaced equal distances apart. The tag is also provided with an upwardly extending neck 19, of considerably reduced width, as compared with the base 15 and connected to the base 15, with an inclined shoulder 20 at each side, which may be inclined at about the angle shown or at a more acute angle to the vertical axis. Neck 19 has a length such that the identification marks, particularly on the front of the base of the tag, will be clearly visible below the hair 21 growing from the lower edge of the ear. The hole 11 of FIG. 3 is, of course, placed in such position in the lower, outer portion of the ear of the animal, such as about 1 inch to 1½ inches from the bottom of the ear, that the identifying marks on the front of the tag will be visible. Also, the hole is preferably placed inwardly from the end of the ear, so that the ear will extend slightly beyond the edge of the base 15 of the tag.

The tag T is conveniently molded from a reasonably flexible material, such as a urethane plastic, other suitable plastic, or the like, which is sufficiently flexible that the tag can be bent and twisted during use. However, in order to insure that the tag, particularly the base 15 thereof, will assume its original position after twisting or bending during use, a horizontal, raised upper rib 22 and a preferably parallel lower rib 23 are provided just above and below the space for the identification marks on one or both of the front and rear of the tag base. Ribs 22 and 23, as in FIG. 3, need not be particularly large or thick, such as having a thickness less than the thickness of the base 15, preferably being just sufficiently thick to cause the base 15 to straighten to a planar condition after being bent or twisted but not sufficiently thick to impede bending or twisting when the tag encounters an object. The identification marks 16 on both sides of base 15 may be formed by molding, but to provide greater visibility, are more conveniently placed thereon in a contrasting color, conveniently by a waterproof, carbon impregnated, marking ink. For the latter purpose, although the remainder of the surface of the tag may have a smooth, glossy finish from molding, the area between the ribs 22 and 23, on which the identification marks 16 are placed, preferably has a relatively rough finish, so that the desired identification marks may be placed on the tags by a conventional marking device carrying the waterproof, preferably carbon pigmented ink. Thus, the area between ribs 22 and 23 may be roughened in any suitable manner, as by sand blasting.

The pin P, as in FIGS. 5 and 6, has a cylindrical stem 25 having at one end the conical point 12 whose rim 27 has a greater diameter than the stem, and, at the opposite end, a button 28 having a convex, rounded surface, such as spheroidal, and a flat end 29, together with a flat, annular surface 30 adjacent stem 25, for a purpose described below. The convex, rounded surface of button 28 will assist in minimizing the possibility of button 28 being caught in a woven wire fence or the like, to prevent the tag being torn from the ear of the animal. Pin P is preferably formed of a less resilient plastic than the tag T and may be formed by injection molding, or in any other suitable manner. Nylon is a preferred material for the pin P, the stem of which extends through hole 11 in the animal's ear, since nylon is non-toxic and is compatible with animal bodies. However, other materials having similar properties may be utilized.

The tag T, at the upper end of neck 19, is provided with a cylindrical socket 31 having a hole 13 therethrough which tapers or decreases slightly in diameter to a well 32, so that the outer portion of hole 13 will tend to grip stem 25 of pin P, as in FIG. 3. Also, well 32 has a diameter slightly greater than the diameter of rim 27 of point 26 of the pin, so that the rim 27 will be received in well 32 and the socket 31 will prevent a fence wire or the like from catching beneath rim 27. Socket 31 also has a flat outer end 33, for a purpose to be described.

If desired, the end of point 12 of pin P may be removed after installation, as by a pair of cutters along dotted line 35, to provide a blunt end and prevent irritation of the animal's neck during use, as in the case of a short haired animal. It will be noted that point 12 of pin P is not only pushed through hole 11 in the animal's ear, but also through hole 13 in tag T. Although both the ear and the tag are sufficiently resilient to permit the same, more than manual force is required, so that a special tool should be utilized, corresponding in construction to a pair of pliers, as in FIG. 7.

A tool preferably utilized for the installation of the self piercing pin P and tag T is, as indicated above, similar to a pair of pliers having a handle (not shown) comprising a pair of pivoted arms adapted to be pushed together by the user. The arms are provided with a linkage arrangement adapted to bring together, in substantially parallel relation, a pair of channel shaped jaws 40 and 41, jaw 40 having an enlarged end 42 holding the base or button 28 of pin P and jaw 41 having an enlarged end 43 holding the socket 31 of tag T. Since the point 12 of pin P is moved through the animal's ear during piercing and then through hole 13 in tag T, it is necessary that pin P be held securely by the tool, while the end of tag T may merely rest in the tool. Thus, a leaf spring 44 having a bifurcated end 45 is mounted on jaw 40, while a clip 46 is attached to jaw 41 for holding the tag in place. A slot 47 is provided in jaw 41, through which point 12 of pin P moves during attachment and which also permits the tool to be pulled off the pin point after attachment. Clip 46 is, of course, also provided with a slot similar to slot 47, through which point 12 of the pin moves during attachment and which also permits the tool to be pulled past stem 25, adjacent the tag, for removal of the tool after attachment. The bifurcated end 45 of spring 44 permits the tool to be pulled past stem 25, adjacent button 28, for removal. The advantage of flat surface 30 is that, if the rounded, convex surface of button 28 were continued to stem 25, the bifurcated end of spring 44 would dig into such a convex surface, increasing the difficulty of removing the tool. However, flat surface 30 permits the end 45 of spring 44 to slide off readily. A slot 48, which may be narrower than slot 47, may be provided in jaw 40, to permit a knife blade or the like to be inserted to engage pin P and urge the same out of the tool, if difficulty is encountered in removing the tool. As will be evident from FIG. 6, jaw 40 engages the flat outer end 29 of button 28, to maintain the pin P accurately in position during application of the force required for installation, i.e., to prevent the pin from tilting. Similarly, jaw 41 engages flat end surface 33 of well 32, to prevent the well from tilting during installation.

A preferred method of installation is to place the socket 31 of tag T in jaw 41, it being noted that with the width of neck 19 the same as the outside diameter of socket 31, neck 19 will prevent the tag from pivoting, as will be evident from FIG. 7. Then, button 28 of pin P is placed under spring 44 in jaw 40 and the jaws closed slightly so that alignment of point 12 of pin P with hole 13 of tag T can be tested. The tool, with the parts so installed, is then inserted over the ear of the animal until the desired piercing point is reached, whereupon the jaws may be closed, to pierce the ear and push point 12 through the tag in a single operation. It will also be noted that, with the neck 19 holding the tag in alignment with the tool, the tag can be held in one hand and the tool in the other, so that the tag and tool can be pulled apart without strain on the animal's ear. Such a method of separation emphasizes the advantage of the flat, annular surface 30 on pin P, which permits spring 44 to slip readily off the pin. Since in the above installation, the tag T extends directly from the tool, the tag T will be alongside the ear, after removal of the tool, but the tag can readily be turned so that it will hang downwardly from the ear of the animal.

From the foregoing, it will be evident that an animal tag of this invention fulfills all of the requirements and objects hereinbefore set forth. Thus, the tag is formed of a material which is sufficiently flexible that it will be bent or twisted by an encounter with an object by the animal. However, the transverse ribs will cause the tag to spring back to its original shape after such an encounter. The tag is particularly adapted to be attached on the inner side of the ear of the animal and thus will not tend to catch in brush or the like. The relatively wide base permits identification marks to be placed on the tag, both front and rear, while the neck which extends above the base permits the tag to be attached to the ear with the base below the ear, so that the identification marks will be visible from both front and rear. The conical point of the pin permits the tag to be readily attached to the ear of an animal, while the socket receives the rim of the point and prevents the rim from being snagged. The conical point of the pin is self piercing, so that the hole in the animal's ear can be produced at the same time that the tag is installed. A conical rounded surface of the pin button minimizes snagging, while a flat surface of the pin button, adjacent the stem, permits a tool holding the stem to be readily withdrawn after installation, particularly when the tool includes a spring engaging the stem base. Also, when the width of the neck is approximately the diameter of the socket, at least adjacent the socket, the neck can be utilized to hold the tag in alignment with the tool, to permit the tool to be separated from the tag after installation, by force exerted between the tool and the tag, without strain on the ear of the animal. As will also be evident, the tag is light in weight and may be manufactured economically.

Although a preferred embodiment has been illustrated and described, it will be understood that numerous variations may be made, without departing from the spirit and scope of this invention.

What is claimed is:

1. The combination of an animal tag and a pin for attaching said tag to the ear of an animal, said tag being formed of sufficiently resilient material to bend or twist during use and having a flat base providing a space on each side adapted to carry an identification mark, each said space having a surface capable of receiving a marking ink or the like;
   a neck extending upwardly from said base and integral therewith, said base being wider than said neck and said neck having a length sufficient that said identification space on both sides of said base will be visible below the ear of an animal to which the upper end of said neck is attached;
   a socket integral with said neck at the upper end thereof and having a thickness greater than said base and neck, said socket extending laterally to one side from said neck, and having a flat, outer end, said socket having a lateral hole therein which decreases in diameter toward said outer end and a well of larger diameter than said hole at the end of lesser diameter; and
   said pin being formed of less resilient material than said tag, but non-toxic to said animal, said pin having:
   a cylindrical stem having a diameter slightly greater than the maximum diameter of said socket hole;
   a coaxial, circular button at one end of said stem having a flat rear end;
   a coaxial, conical point at the other end of said stem, said conical point having a rear rim of a diameter greater than that of said stem but less than that of said well and said conical point being self piercing, thereby permitting said ear tag to be installed by pushing said point through a lower, insensitive portion of the ear of an animal and into and through said socket hole, through pressure between said button and the flat end of said socket; and
   said neck being flat against said ear of said animal, both during and after installation.

2. The combination defined in claim 1, wherein said circular button of said pin is provided with a rounded, convex outer surface and a flat, annular surface adjacent said stem.

3. The combination of an animal tag and a pin for attaching said tag to an ear of an animal, said tag having a base on which indicia may be placed and a socket connected to said base, said socket having a transverse hole therethrough, said pin comprising:
   a stem;
   a conical self-piercing point at one end of said stem; and
   a coaxial button at the opposite end of said stem, said button having a flat rear end, a rounded convex outer surface and a flat, annular surface adjacent said stem;
   said pin being adapted to be inserted through an ear of an animal, so as to attach said tag thereto, by a tool having opposed jaws respectively engaging said socket and said rear end of said button, said jaw engaging said button having a bifurcated spring clip adapted to engage said flat surface adjacent said stem for holding said pin to said jaw while inserting said conical point through said animal's ear and thence through said hole in said socket, said flat surface adjacent said stem permitting said tool to be slipped from said button after installation of said tag, without said spring clip binding on said pin.

4. The combination of an animal tag and a pin for attaching said tag to the ear of an animal, said tag being formed integrally of sufficiently resilient material to bend or twist during use and having:
   a generally rectangular base provided with rounded corners, said base being flat and provided on each side with a surface area adapted to receive a marking ink, so that identification marks may be placed thereon;
   a neck extending upwardly from said base and having a width less than the width of said base, with a shoulder sloping inwardly and upwardly from each side of said base to said neck;
   a cylindrical socket at the upper end of said neck and extending to one side thereof, said socket having a flat outer end, an axial hole decreasing in diameter toward said end and a cylindrical well at the outer end of said hole; and
   said pin being integral and formed of less resilient material than said tag, said pin having:
   a cylindrical stem with a diameter slightly greater than the minimum diameter of said socket hole;
   a coaxial circular button at one end of said stem and having a convex rounded outer surface; and
   a coaxial conical point at the other end of said stem, said conical point having a rim of a diameter greater than that of said stem but slightly less than that of said well, whereby
   said tag may be attached to an ear of said animal by said pin by pressing the flat side of said neck, opposite said socket, against said ear and pushing the conical point of said pin through said ear, from the side opposite said tag, so that said conical point will pass through said ear and into said socket, on the neck side, and then through said axial hole, until said rim of said point enters said well of said socket, said tag thereby fitting closely against the ear of said animal, with said base being disposable below the lower edge of said ear and said identification marks thereby being visible from both front and rear.

5. The combination defined in claim 4, wherein:
   the neck of said tag has a width approximately the same as the diameter of said socket; and
   said button of said pin is provided with a flat, annular surface adjacent said stem.

References Cited by the Examiner

UNITED STATES PATENTS

| 1,011,911 | 12/1911 | Burgess | 40—302 |
| 1,073,828 | 9/1913 | Wallin | 40—29 |
| 2,538,396 | 1/1951 | Sutin | 24—208.2 |
| 2,940,199 | 6/1960 | Goldberg | 40—301 |

FOREIGN PATENTS

| 644,354 | 7/1962 | Canada. |
| 323,145 | 12/1929 | Great Britain. |
| 621,404 | 4/1949 | Great Britain. |
| 681,381 | 10/1952 | Great Britain. |

EUGENE R. CAPOZIO, *Primary Examiner.*

WENCELSO J. CONTRERAS, *Assistant Examiner.*